(12) United States Patent
Lin

(10) Patent No.: US 7,697,209 B2
(45) Date of Patent: Apr. 13, 2010

(54) DICHROIC MIRROR

(75) Inventor: Juin-Hong Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/957,345

(22) Filed: Dec. 14, 2007

(65) Prior Publication Data

US 2009/0116112 A1    May 7, 2009

(30) Foreign Application Priority Data

Nov. 6, 2007    (CN)    ............... 2007 1 0202395

(51) Int. Cl.
   *G02B 27/14*    (2006.01)
   *G02B 27/10*    (2006.01)
(52) U.S. Cl. ..................... 359/634; 359/595
(58) Field of Classification Search ............ 359/634, 359/636, 638, 585
   See application file for complete search history.

(56) References Cited

U.S. PATENT DOCUMENTS 6,249,378 B1 *  6/2001  Shimamura et al. ......... 359/487

6,310,729 B1 * 10/2001  Tsukamoto ................. 359/634
7,165,846 B2    1/2007  Sannohe

FOREIGN PATENT DOCUMENTS

JP    11-211916 A    8/1999

\* cited by examiner

*Primary Examiner*—Ricky L Mack
*Assistant Examiner*—Brandi N Thomas
(74) *Attorney, Agent, or Firm*—Zhigang Ma

(57) ABSTRACT

A dichroic mirror includes a substrate and a dielectric multilayered film formed on a surface of the substrate. The dielectric multilayered film includes a first period layer with a structure represented by a formula $(0.33H 0.66L 0.33H)^n$ and a second period layer with a structure represented by a formula $(2HM)^m$. Wherein H represents a high refractive index layer, L represents a low refractive index layer, M represents a middle refractive index layer, all of the H, L and M are set at ¼ lambda of a reference wavelength associated with the film, the m and n represent the number of repetitions of the structure, enclosed by the parentheses, used in the correspond first period layer or second period layer.

20 Claims, 3 Drawing Sheets

DICHROIC MIRROR

TECHNICAL FIELD

The present invention relates to a dichroic mirror, particularly, to a dichroic mirror can be used for reflecting blue light.

DESCRIPTION OF RELATED ART

FIG. 3 is a graph showing spectral transmittance characteristics of a typical blue reflecting dichroic mirror. The structure of the film formed on the typical blue reflecting dichroic mirror is represented by the formula $(0.5HL0.5H)^n$, wherein H represents a high refractive index layer and L represents a low refractive index layer, H and L are set at ¼ lambda of a reference wavelength associated with the film, and the superscript represents the number of repetitions of the structure, enclosed by the parentheses, used in the film.

The light has an obviously wider reflected S-polarized component wavelength range than the reflected P-polarized component wavelength range and therefore the reflection characteristics of the typical blue reflecting dichroic mirror has polarization dependency, as shown in FIG. 4. When these dichroic mirrors are used in a projector, brightness and contrast levels are undesirably decreased, and a clear image cannot be projected.

What is needed, therefore, is a dichroic mirror that can overcome the above-described shortcomings.

SUMMARY

In accordance with one present embodiment, a dichroic mirror includes a substrate and a dielectric multilayered film formed on a surface of the substrate. The dielectric multilayered film includes a first period layer with a structure represented by a formula $(0.33H0.66L0.33H)^n$ and a second period layer with a structure represented by a formula $(2HM)^m$. Wherein H represents a high refractive index layer, L represents a low refractive index layer, M represents a middle refractive index layer, H, L and M are each set at ¼ lambda of a reference wavelength associated with the film, the m and n represent the number of repetitions of the structure, enclosed by the parentheses, used in the correspond first period layer or second period layer.

BRIEF DESCRIPTION OF THE DRAWING

Many aspects of the present dichroic mirror can be better understood with reference to the following drawings. The components in the drawing are not necessarily drawn to scale, the emphasis instead being placed upon clearly illustrating the principles of the present dichroic mirror.

DETAILED DESCRIPTION OF THE EMBODIMENTS

Embodiments of the present invention will now be described in detail below, with reference to the drawings.

Figure 1:
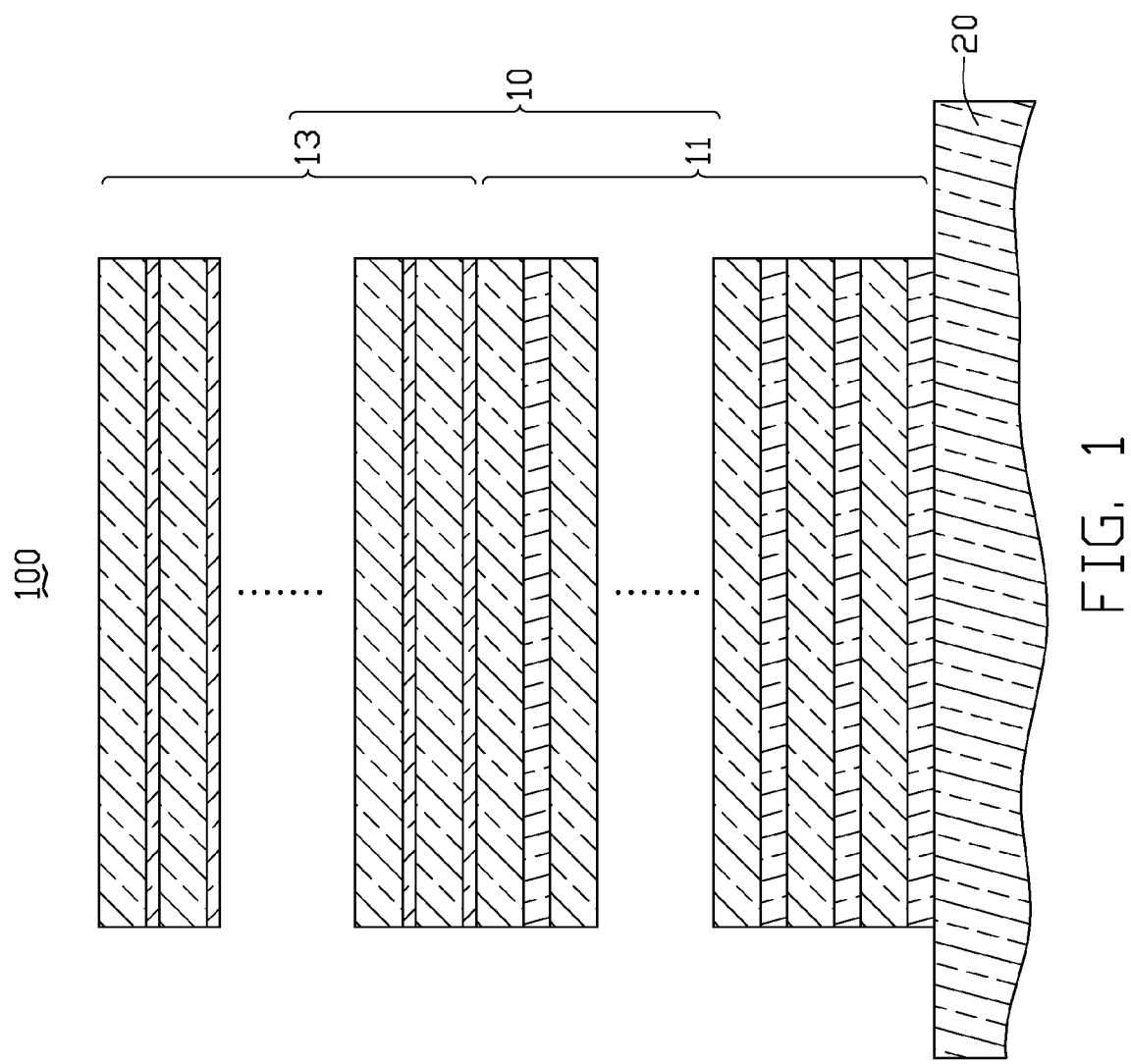
FIG. 1 is a schematic view of a dichroic mirror according to a present embodiment of the present invention.

Referring to FIG. 1, a dichroic mirror 100, according to an embodiment, is shown. The dichroic mirror 100 includes a substrate 20 and a dielectric multilayered film 10 formed on a surface of the substrate 20. The material of the substrate 20 can be selected from glass or plastic.

The dielectric multilayered film 10 includes a first period layer 11 and a second period layer 13. The first period layer 11 includes alternately formed high refractive index layers and low refractive index layers. The second period layer 13 includes alternately formed high refractive index layers and middle refractive index layers. The order in which the first period layer 11 and the second period layer 13 are applied to the dielectric multilayered film 10 is interchangeable without effect.

The structure of the first period layer 11 is represented by a formula $(0.33H0.66L0.33H)^n$, wherein H represents a high refractive index layer and L represents a low refractive index layer, H and L are set at ¼ lambda of a reference wavelength associated with the film, the n represents the number of repetitions of the structure, enclosed by the parentheses, used in the first period layer 11. The reference wavelength is in a range from 500 nm to 700 nm. The value of the n is in a range from 8 to 12.

The structure of the second period layer 13 is represented by a formula $(2HM)^m$, Wherein H represents a high refractive index layer and M represents a middle refractive index layer, H and M are set at ¼ lambda of a reference wavelength associated with the film, the m represents the number of repetitions of the structure enclosed by the parentheses. The reference wavelength is in a range from 500 nm to 700 nm. The value of the m is in a range from 12 to 16.

In the present embodiment, a material with refractive index in a range from 1.4 to 1.5 is used as the low refractive index material. The low refractive index material can be selected from a group consisting of $MgF_2$ and $SiO_2$. A material with refractive index in a range from 2.0 to 2.5 is used as the high refractive index material. The high refractive index material can be selected from a group consisting of $TiO_2$, $Ta_2O_5$, and $Nb_2O_5$. A material with refractive index in a range from 1.6 to 1.9 is used as the middle refractive index material. The middle refractive index material can be selected from a group consisting of $Al_2O_3$, $MgO$, and $Y_2O_3$.

Figure 2:
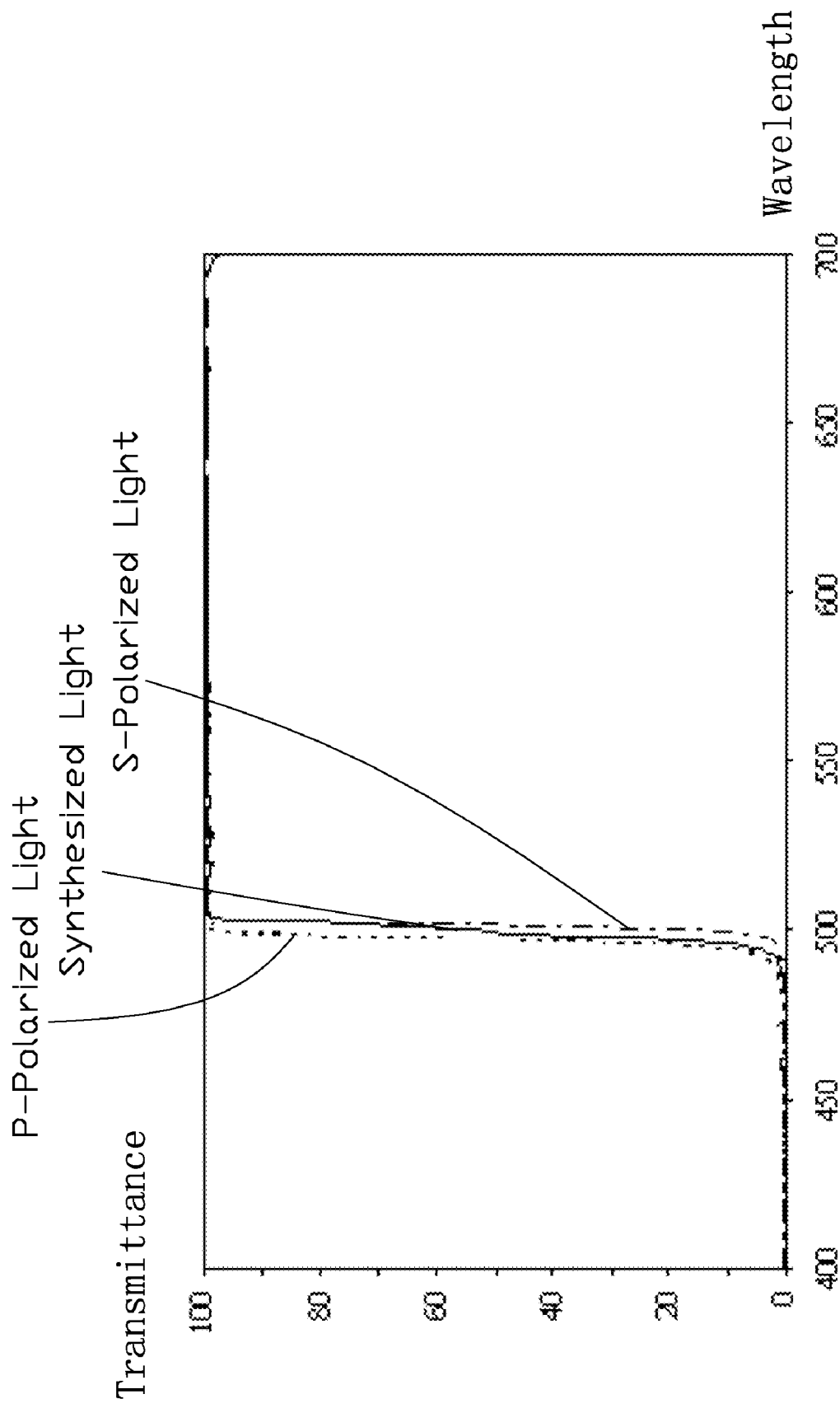
FIG. 2 is a graph showing transmittance characteristics of a dichroic mirror according to an exemplary embodiment of the present invention.
Figure 3:
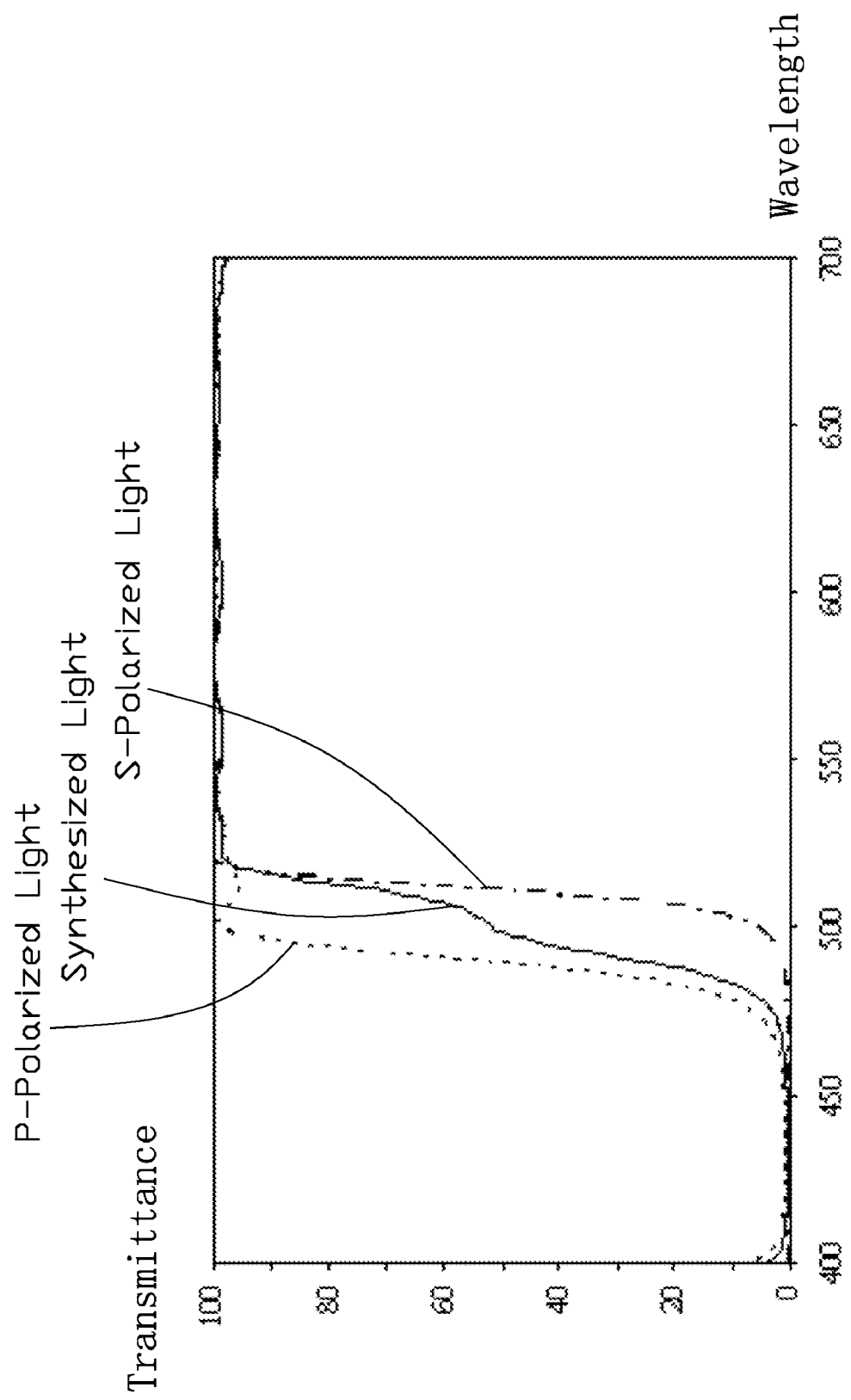
FIG. 3 is a graph showing transmittance characteristics of a dichroic mirror according to a related art.

An example of the dichroic mirror 100 will be described below with reference to FIG. 2. It is to be understood that the invention is not limited to this example.

The structure of dielectric multilayered film 10 of the dichroic mirror 100 according to an exemplary example is represented by a formula $(2HM)^{14}(0.33H0.66L0.33H)^{10}$, and the reference wavelength is 645 nm. Referring to FIG. 2, a graph shows transmittance characteristics of the dichroic mirror 100 according to the exemplary example. The abscissa of the graph represents wavelengths and the ordinate of the graph represents transmittance. From the FIG. 2, we can see that the reflected S-polarized component wavelength range is essentially the same as the reflected P-polarized component wavelength range.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A dichroic mirror comprising:
a substrate; and
a dielectric multilayered film formed on a surface of the substrate, the dielectric multilayered film comprising:

a first period layer with a structure represented by a formula $(0.33H 0.66L 0.33H)^n$; and a second period layer with a structure represented by a formula $(2HM)^m$, wherein, H represents a high refractive index layer, L represents a low refractive index layer, M represents a middle refractive index layer, all of the H, L and M are set at ¼ lambda of a reference wavelength associated with the film, the m and n represent the number of repetitions of the structure, enclosed by the parentheses, forming the first period layer and second period layer respectively.

2. The dichroic mirror as claimed in claim 1, wherein the reference wavelength is in a range from 500 nm to 700 nm.

3. The dichroic mirror as claimed in claim 1, wherein the value of the m is in a range from 12 to 16.

4. The dichroic mirror as claimed in claim 1, wherein the value of the n is in a range from 8 to 12.

5. The dichroic mirror as claimed in claim 1, wherein the refractive index of the high refractive index material is in a range from 2.0 to 2.5.

6. The dichroic mirror as claimed in claim 1, wherein the high refractive index material is comprised of a material selected from a group consisting of $TiO_2$, $Ta_2O_5$, and $Nb_2O_5$.

7. The dichroic mirror as claimed in claim 1, wherein the refractive index of the low refractive index material is in a range from 1.4 to 1.5.

8. The dichroic mirror as claimed in claim 1, wherein the low refractive index material is comprised of a material selected from a group consisting of $MgF_2$ and $SiO_2$.

9. The dichroic mirror as claimed in claim 1, wherein the refractive index of the middle refractive index material is in a range from 1.6 to 1.9.

10. The dichroic mirror as claimed in claim 1, wherein the middle refractive index material is comprised of a material selected from a group consisting of $Al_2O_3$, MgO, and $Y_2O_3$.

11. A dielectric multilayered film of a dichroic mirror comprising:

a first period layer with a structure represented by a formula $(0.33H 0.66L 0.33H)^n$; and a second period layer with a structure represented by a formula $(2HM)^m$, wherein, H represents a high refractive index layer, L represents a low refractive index layer, M represents a middle refractive index layer, all of the H, L and M are set at ¼ lambda of a reference wavelength associated with the film, the m and n represent the number of repetitions of the structure, enclosed by the parentheses, forming the first period layer and second period layer respectively.

12. The dielectric multilayered film as claimed in claim 11, wherein the reference wavelength is in a range from 500 nm to 700 nm.

13. The dielectric multilayered film as claimed in claim 11, wherein the value of the m is in a range from 12 to 16.

14. The dielectric multilayered film as claimed in claim 11, wherein the value of the n is in a range from 8 to 12.

15. The dielectric multilayered film as claimed in claim 11, wherein the refractive index of the high refractive index material is in a range from 2.0 to 2.5.

16. The dielectric multilayered film as claimed in claim 11, wherein the high refractive index material is comprised of a material selected from a group consisting of $TiO_2$, $Ta_2O_5$, and $Nb_2O_5$.

17. The dielectric multilayered film as claimed in claim 11, wherein the refractive index of the low refractive index material is in a range from 1.4 to 1.5.

18. The dielectric multilayered film as claimed in claim 11, wherein the low refractive index material is comprised of a material selected from a group consisting of $MgF_2$ and $SiO_2$.

19. The dielectric multilayered film as claimed in claim 11, wherein the refractive index of the middle refractive index material is in a range from 1.6 to 1.9.

20. The dielectric multilayered film as claimed in claim 11, wherein the middle refractive index material is comprised of a material selected from a group consisting of $Al_2O_3$, MgO, and $Y_2O_3$.

* * * * *